3,230,692
SEPARATION OF VINYL FLUORIDE AND ACETYLENE

Karl Heinz Mieglitz, Bad Wimpfen, Heinz Werner Linke, Hannover, and Heinz Heinze, Arnum, Germany, assignors to Kali-Chemie Aktiengesellschaft, Hannover, Germany
No Drawing. Filed Aug. 2, 1963, Ser. No. 300,415
2 Claims. (Cl. 55—56)

This invention relates to the removal of acetylene contained in vinyl as a result of its method of manufacture.

In all commercially known methods for the preparation of vinyl fluoride by reaction of acetylene and hydrogen fluoride, the reaction products contain unreacted acetylene as impurity, and they may also contain vinyl chloride if mercury chloride was used as a catalyst. These impurities are objectionable with regard to subsequent uses, particularly when the products are to be used for polymerization. The recovery and re-use of the acetylene is also essential for the economy of the vinyl fluoride synthesis process.

The recovery of acetylene by chemical methods is uneconomic because it requires a great number of operations.

The recovery by means of fractionated distillation, which has been successfully applied in similar cases, cannot be applied to the separation of acetylene from vinyl fluoride for two reasons. In the first place, the difference of the boiling points (vinyl fluoride —72° C., acetylene —84° C.) is so small as to require elaborate apparatus; secondly, the distillation can be carried out only after liquefaction of both gases either by strong refrigeration or by compression, which would require again a considerable energy expenditure. In addition, the amnipulation of liquefied acetylene, particularly when under pressure, is dangerous, so that such separation method will be avoided, if possible.

A general method for the separation of gas mixtures is the extraction with suitable solvents which possess different dissolving power for the respective gases. Generally, a difference in said power of 1:5 to 1:10 is considered sufficient and necessary for a commercially useful separation. So far, no such solvent had been found, and separation of acetylene and vinyl fluoride by selective absorption has, therefore, not been possible.

We have now found that a separation of a gas mixture containing acetylene and vinyl fluoride by selective absorption is possible also when the solubilities of the two gases satisfy a ratio of only 1:2 to 1:4. We have observed that certain solvents, when they are saturated with acetylene, do no longer absorb vinyl fluoride or even release already dissolved vinyl fluoride. Such solvents are, for instance, dimethyl sulfoxide, dimethyl formamide, N-methyl pyrrolidone, and mixtures of these compounds.

The solvent saturated with acetylene can be freed from the dissolved gas, for instance by raising its temperature or reducing the pressure, and then recycled into the extraction step. The recovery acetylene can be re-used for the reaction with hydrogen fluoride. It is a further advantage of our process that vinyl chloride contained in the gas mixture is also separated from the vinyl fluoride. In the extraction, the vinyl chloride is absorbed together with the acetylene and can be recovered.

The process of the invention may be carried out as follows:

In an absorption column operated at constant temperature and constant pressure, the solvent is passed downwardly in countercurrent to a gas mixture which consists of vinyl fluoride and acetylene and may, in addition, contain vinyl chloride. The temperature is in the range of —30 to +50° C., preferably between 0 to 15° C. Preferably, the column is operated at atmospheric pressure but higher pressures up to 1 atü and even higher may be used. The amount of solvent and the contact time are adjusted to obtain saturation with $C_2H_2$, which is recovered with a content of about 1 to 3% of vinyl fluoride. Said acetylene contains also vinyl chloride contained as impurity in the original gas mixture. The gas leaving the top of the column is vinyl fluoride of 99.0 to 99.5% purity.

The following examples illustrate further the invention:

Example 1

At the bottom of a 2 m. high absorption column filled with packing spirals (Braunschweiger Wendeln) and maintained by means of a cooling jacket at a temperature of 0° C., a gas mixture consisting of 67.0% vinyl fluoride, 31.5% acetylene, and 1.5% vinyl chloride is introduced at a rate of 150 liter/hour. A metering pump supplies 4.3 liter/hour of dimethyl formamide to the top of the column.

The gas recovered from the top of the column consists of 99.2% of vinyl fluoride, the balance being acetylene.

The solvent contains, in addition to the absorbed acetylene, substantially the entire vinyl chloride and also 1.8% of vinyl fluoride. The acetylene is recovered quantitatively by heating the dimethyl formamide at about 140 to 145° C. The solvent freed from acetylene is re-used for the absorption.

Example 2

120 liters per hour of a gas mixture consisting of about 75% of vinyl fluoride and 25% of acetylene are introduced into the bottom of a bubble cap plate column of about 2 m. height which is maintained by means of a cooling jacket at a temperature of 10° C. 5.2 l./h. of dimethyl sulfoxide are charged at the top of the column and passed downwardly in countercurrent to the gas. Thereby, substantially the entire acetylene is dissolved out of the gas. At the top of the column, a vinyl fluoride of 99.8% purity is recovered.

The solvent is freed from the dissolved acetylene by heating in a falling film type vaporizer by heating to a temperature just below its boiling point. In this way, the solvent can be returned to the absorption cycle. The recovered acetylene still contains about 2% of vinyl fluoride and is recycled into the reactor.

Example 3

50 l./h. of a gas mixture consisting of 15% of acetylene and 85% of vinyl fluoride are introduced at the bottom of a 1.5 m. high column packed with spirals as in Example 1 and cooled externally to 20° C. From the head of the column, 0.8 l./h. of N-methylpyrrolidone are passed downwardly in countercurrent to the gas to dissolve out the acetylene. Thereby, an about 99.7% vinyl fluoride is obtained at the top of the column, the balance being acetylene. The solvent containing the dissolved acetylene is passed through a packed column at about 190° C. to drive off the acetylene which is completely recovered together with 3 l./h. of vinyl flouride which had been absorbed by the solvent. The purified N-methylpyrrolidone is returned to the absorption column for further separation of the acetylene-vinyl fluoride mixture.

We claim:
1. A method for the separation of acetylene from a gaseous vinyl fluoride stream containing acetylene as an impurity in admixture with said vinyl fluoride, said method comprising contacting said gas stream with a sol- vent selected from the group consisting of dimethyl formamide, dimethyl sulfoxide, N-methylpyrrolidone, and mixtures thereof, to absorb the acetylene selectively in said solvent, said absorbed acetylene reducing the solubility of said vinyl fluoride in said solvent, recovering unabsorbed vinyl fluoride essentially free from acetylene, and heating the obtained solution to drive off the absorbed acetylene.

2. A method for the separation of acetylene and vinyl chloride from a gaseous vinyl fluoride stream containing said impurities in admixture with said vinyl fluoride, said method comprising contacting said gas stream with a solvent selected from the group consisting of dimethyl formamide, dimethyl sulfoxide, N-methylpyrrolidone, and mixtures thereof, to absorb said acetylene and vinyl chloride selectively in said solvent, said absorbed acetylene and vinyl chloride reducing the solubility of said vinyl fluoride in said solvent, recovering unabsorbed vinyl fluoride essentially free from acetylene and vinyl chloride, and heating the obtained solution to drive off the absorbed acetylene and vinyl chloride.

References Cited by the Examiner
UNITED STATES PATENTS

| | | | |
|---|---|---|---|
| 2,252,536 | 8/1941 | Wiley | 55—65 |
| 2,858,347 | 10/1958 | Hutchings | 55—71 |
| 2,909,241 | 10/1959 | Rummert | 55—38 |
| 3,106,462 | 10/1963 | Cottle | 55—64 |

FOREIGN PATENTS 659,603  3/1963  Canada.

REUBEN FRIEDMAN, *Primary Examiner.*

B. NOZICK, *Assistant Examiner.*